(12) United States Patent
Crotti et al.

(10) Patent No.: US 11,021,055 B2
(45) Date of Patent: Jun. 1, 2021

(54) MOTOR VEHICLE INCLUDING AN ELECTRIC AXLE

(71) Applicant: FERRARI S.p.A., Modena (IT)

(72) Inventors: Francesco Crotti, Modena (IT); Renaud Marlier, Modena (IT); Fabrizio Favaretto, Formigine (IT)

(73) Assignee: FERRARI S.p.A., Modena (IT)

( * ) Notice: Subject to any disclaimer, the term of this patent is extended or adjusted under 35 U.S.C. 154(b) by 42 days.

(21) Appl. No.: 16/513,863

(22) Filed: Jul. 17, 2019

(65) Prior Publication Data

US 2020/0023734 A1    Jan. 23, 2020

(30) Foreign Application Priority Data

Jul. 17, 2018 (IT) .................... 102018000007255

(51) Int. Cl.
| | | |
|---|---|---|
| *B60K 17/06* | (2006.01) | |
| *B60K 1/02* | (2006.01) | |
| *B60K 6/52* | (2007.10) | |
| *B60K 17/354* | (2006.01) | |
| *B60L 50/60* | (2019.01) | |
| *B60L 50/10* | (2019.01) | |
| *B60L 53/80* | (2019.01) | |
| *B60K 1/04* | (2019.01) | |

(Continued)

(52) U.S. Cl.
CPC ............. *B60K 17/354* (2013.01); *B60K 1/02* (2013.01); *B60K 1/04* (2013.01); *B60K 5/00* (2013.01); *B60K 6/52* (2013.01); *B60K 17/06* (2013.01); *B60K 17/22* (2013.01); *B60L 50/10* (2019.02); *B60L 50/66* (2019.02); *B60L 53/80* (2019.02); *B60K 2001/0438* (2013.01); *B60Y 2200/91* (2013.01); *B60Y 2200/92* (2013.01); *B60Y 2400/80* (2013.01)

(58) Field of Classification Search
CPC ...... B60K 17/354; B60K 17/06; B60K 17/22; B60K 1/02; B60K 1/04; B60K 5/00; B60K 6/52; B60L 50/66; B60L 50/10; B60L 53/80
USPC ....................................... 180/65.22
See application file for complete search history.

(56) References Cited

U.S. PATENT DOCUMENTS

| | | | | |
|---|---|---|---|---|
| 8,776,925 B2 * | 7/2014 | Bender | .................. | B60L 58/21 180/68.5 |
| 10,384,524 B2 * | 8/2019 | Spiegel | ................... | B60K 1/02 |
| 10,569,638 B2 * | 2/2020 | Welschoff | ............... | B60K 6/28 |

(Continued)

FOREIGN PATENT DOCUMENTS

| | | |
|---|---|---|
| DE | 29518401 U1 | 3/1997 |
| FR | 3052110 A1 | 12/2017 |

(Continued)

OTHER PUBLICATIONS

Search Report issued in Italian Application No. 201800007255, completed Mar. 8, 2019; 11 pages.

*Primary Examiner* — John D Walters
(74) *Attorney, Agent, or Firm* — Cantor Colburn LLP (57) ABSTRACT

A motor module for modularly making a front and/or rear electric axle, comprising an electric motor generator and a gear train enclosed in a gearbox case permanently fixed to a stator of said electric motor-generator, the module having an L-shape. Electric axle comprising a pair of L-shaped modules for making a T-shaped front electric axle and a U-shaped rear electric axle.

10 Claims, 8 Drawing Sheets

(51) Int. Cl.
   *B60K 5/00*     (2006.01)
   *B60K 17/22*    (2006.01)

(56) References Cited

U.S. PATENT DOCUMENTS

| | | | |
|---|---|---|---|
| 2011/0094807 A1* | 4/2011 | Pruitt | B60K 17/36 180/65.6 |
| 2011/0259657 A1* | 10/2011 | Fuechtner | B60K 7/0007 180/65.21 |
| 2012/0199406 A1 | 8/2012 | Bender et al. | |

FOREIGN PATENT DOCUMENTS

| | | |
|---|---|---|
| FR | 3053007 A1 | 12/2017 |
| JP | 2012001196 A | 1/2012 |

\* cited by examiner

MOTOR VEHICLE INCLUDING AN ELECTRIC AXLE

CROSS-REFERENCE TO RELATED APPLICATIONS

This Patent application claims priority from Italian Patent Application No. 102018000007255 filed on Jul. 17, 2018, the entire disclosure of which is incorporated herein by reference.

FIELD OF APPLICATION OF THE INVENTION

The present invention relates to the field of electric axles.

PRIOR ART

Patent application EP2213494A1 shows a first electric powertrain system arranged in the front position (i.e. to transmit motion to the front drive wheels) and a second electric powertrain system arranged in the rear position (i.e. to transmit motion to the rear drive wheels) and mechanically entirely independent and separate from the first electric powertrain system.

Patent application US2010006351A1 describes an electrically powered road vehicle comprising four drive wheels and four reversible electric machines, each of which is mechanically entirely independent of the other electric machines and has a shaft directly connected to a corresponding drive wheel.

Defining the arrangement of the components of the vehicle, the housing of the electrical machines and the battery pack is one of the most critical phases.

The rear of the vehicle is often used to house a battery pack. The front of the vehicle has a steering axle to which the steering box and its levers must be joined. Therefore, for the same car it is necessary to create specific components for the forecarriage and the rear carriage. This entails a significant cost increase, especially if the components are to have high performance and reliability.

Patent application US2011259657A1 discloses an electric drive system for a vehicle comprising a pair of electric machines, each of which transmits the driving torque to a corresponding axle shaft through a gear formed of three gearwheels arranged in cascade.

Patent application US2011094807A1 discloses an electrically powered vehicle in which an electric axle provided with a single electric machine or two independent electric machines transmits a driving torque to the front or rear wheels.

If not specifically excluded in the detailed description below, what is described in this section is to be considered as an integral part of the same.

SUMMARY OF THE INVENTION

The object of the present invention is to provide a motor vehicle comprising an electric axle which is simple to manufacture.

The dependent claims describe preferred variants of the invention, forming an integral part of the present description.

BRIEF DESCRIPTION OF THE DRAWINGS

Further purposes and advantages of the present invention will be evident from the following detailed description of an example of an embodiment (and variants thereof) and the accompanying drawings, provided purely for explanatory and non-limiting purposes, wherein.

The same reference numbers and letters in the figures identify the same elements or components.

As used herein, the term "second" component does not imply the presence of a "first" component. These terms are in fact used as labels for improved clarity and should not be construed as limiting.

The elements and features disclosed in the various preferred embodiments, including the drawings, may be combined with one another without however departing from the scope of protection of the present application as described below.

DETAILED DESCRIPTION OF EMBODIMENTS

Figure 1:
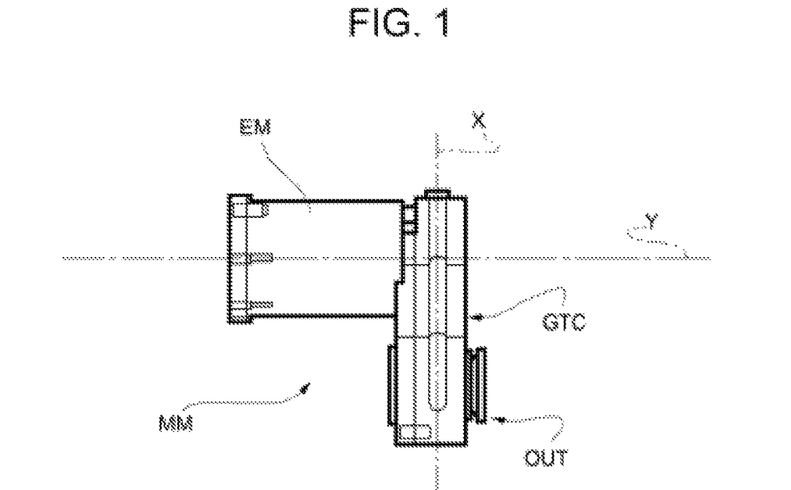
FIG. 1 shows an example of the motor module according to the present invention.

FIG. 1 shows a motor module MM according to the present invention.

The Y axis represents the rotation axis of the rotor of the electric motor-generator EM shown in the same figure.

The gearbox case GTC encloses a gear train operatively driven in rotation by the drive shaft of the electric motor-generator EM. This gearbox case has a longitudinal extension along the X axis perpendicular to the axis of rotation Y of the drive shaft of the electric motor-generator EM.

OUT indicates the output of the gear train suitable to be operatively connected with a drive wheel of a motor vehicle, for example via an axle shaft fitted with special joints, in themselves known.

The auxiliary shaft has both ends accessible, as a result both said ends may represent the OUT output of the gear train.

Figure 2:
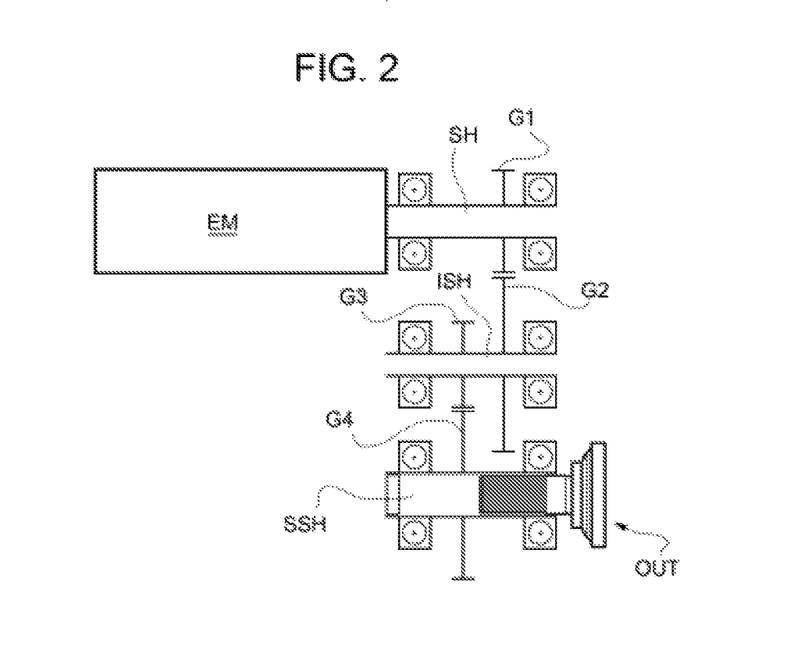
FIG. 2 shows a schematic drawing of the motor module in FIG. 1 in which at least part of the casing has been removed to make the internal components visible.

FIG. 2 schematically shows the gear train enclosed in the gearbox case GTC (not shown here).

The drive shaft SH of the electric motor-generator EM has only one accessible end. Onto said accessible end of the drive shaft SH a first gear wheel G1 is permanently fitted which operatively meshes with a second gear wheel G2 permanently fitted onto an intermediate shaft ISH. A third gear wheel G3 is permanently fitted onto the intermediate shaft and operatively meshes with a fourth gear wheel G4 permanently fitted onto a secondary shaft SSH.

Between the drive shaft and the secondary shaft one or more intermediate shafts with gearwheels operatively fitted may be interposed to transfer motion from the drive shaft SH to the secondary shaft SSH.

The drive shaft and the secondary shaft are parallel to each other and identify a plane in which the one or more intermediate shafts ISH lie. This makes the gear train distended along the direction identified by the X axis, perpendicular to the Y axis. The intermediate shafts need not lie perfectly in the aforesaid plane, in the sense that in relation to the specific conditions small variations are acceptable, however, the basic concept according to which the gear train casing is longitudinal, oriented perpendicular to the drive shaft remains unchanged.

Figures 3, 4:
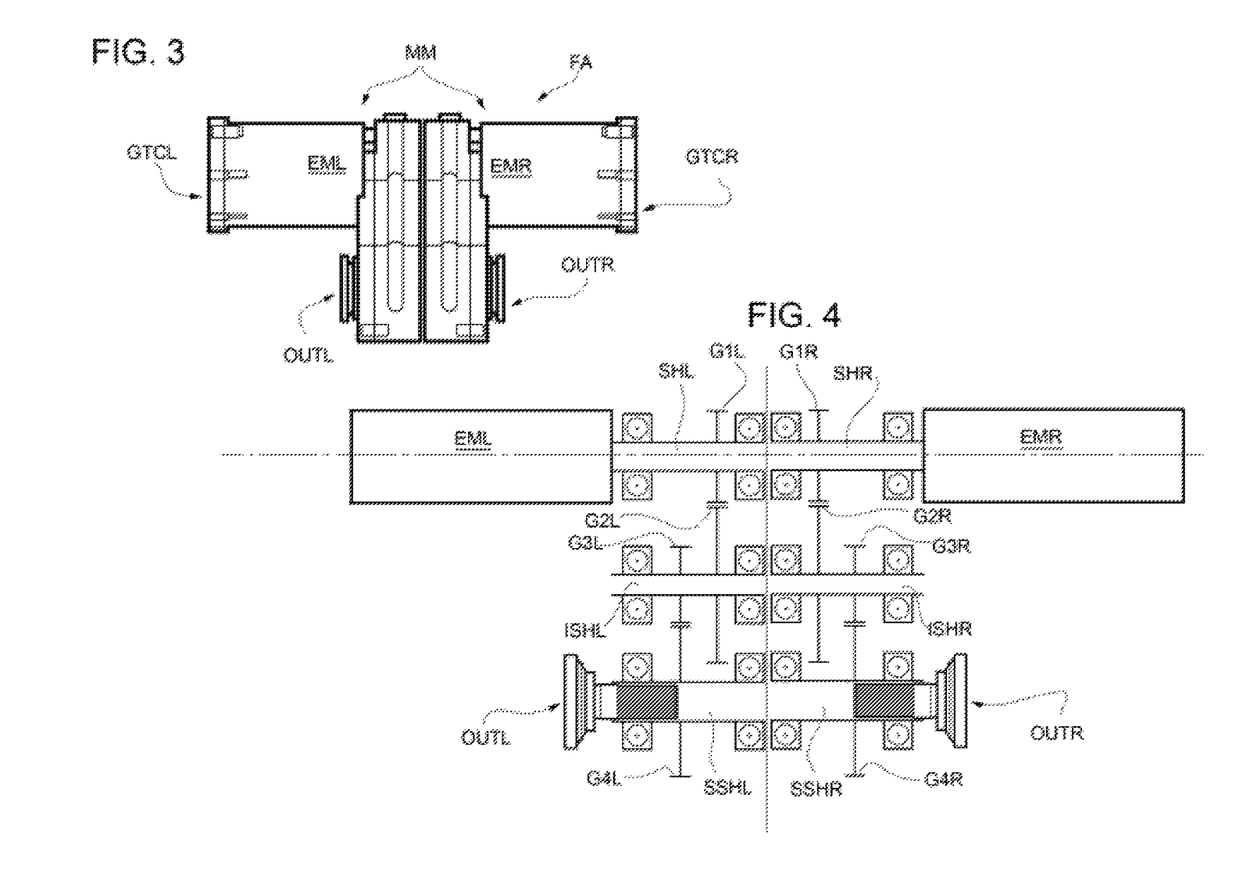
FIG. 3 shows a first configuration of a complete front axle comprising a pair of modules according to the schematic example in FIG. 1.
FIG. 4 shows the same axle as in FIG. 3 in which at least a portion of the motor module casings have been removed to make the internal components visible.
Figure 8:
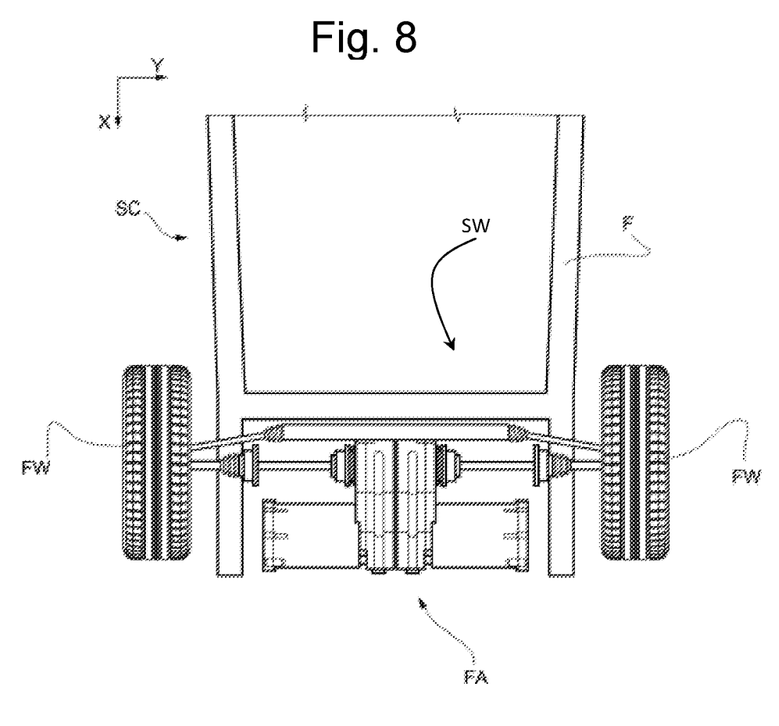
FIG. 8 shows a detailed plan view of the front electric axle depicted in FIG. 7.

FIG. 3 shows a first electric axle FA, according to the present invention, made by a pair of motor modules MM, identical to each other and arranged symmetrically. The electric axle is made by arranging the electric motor-generators in a distal/external position, mutually aligning the casings of the relative gear trains, so that the drive shafts SHR, SHL are coaxial with each other along the direction Y indicated in FIG. 1. In addition, the longitudinal extensions X of the respective GT gear trains lie in the same plane. This causes the axle conformation to be generally T-shaped (inverted in FIG. 8).

In this configuration, only the outer ends of the SSHR and SSGL secondary shafts are accessible.

As a result, the right motor-generator EMR and the left motor generator EML are respectively identified, operatively connected for the right GTCR and left GTCL casings of the respective gear trains, as far as the right OUTR and left OUTL outputs.

FIG. 4 shows, correspondingly, in detail the gear trains contained in the casings with the right SHR and left SHL drive shafts.

The accessible ends of the drive shaft are preferably supported by a pair of bearings between which the first right gear wheel G1R and left gear wheel G1L are fitted. Similarly, the right ISHR and left ISHL intermediate shafts have both ends supported by a pair of bearings and between them the second and third gear wheels respectively G2R, G3R right and left G2L, G3L are fitted. Similarly, the right SSHR and left SSHL secondary shafts have both ends supported by a pair of bearings and between them a fourth gear wheel respectively right G4R and left G4L is fitted.

It should be noted that the reference marks are unchanged except for the suffix "L" or "R" indicating left and right respectively.

Figures 5, 6:
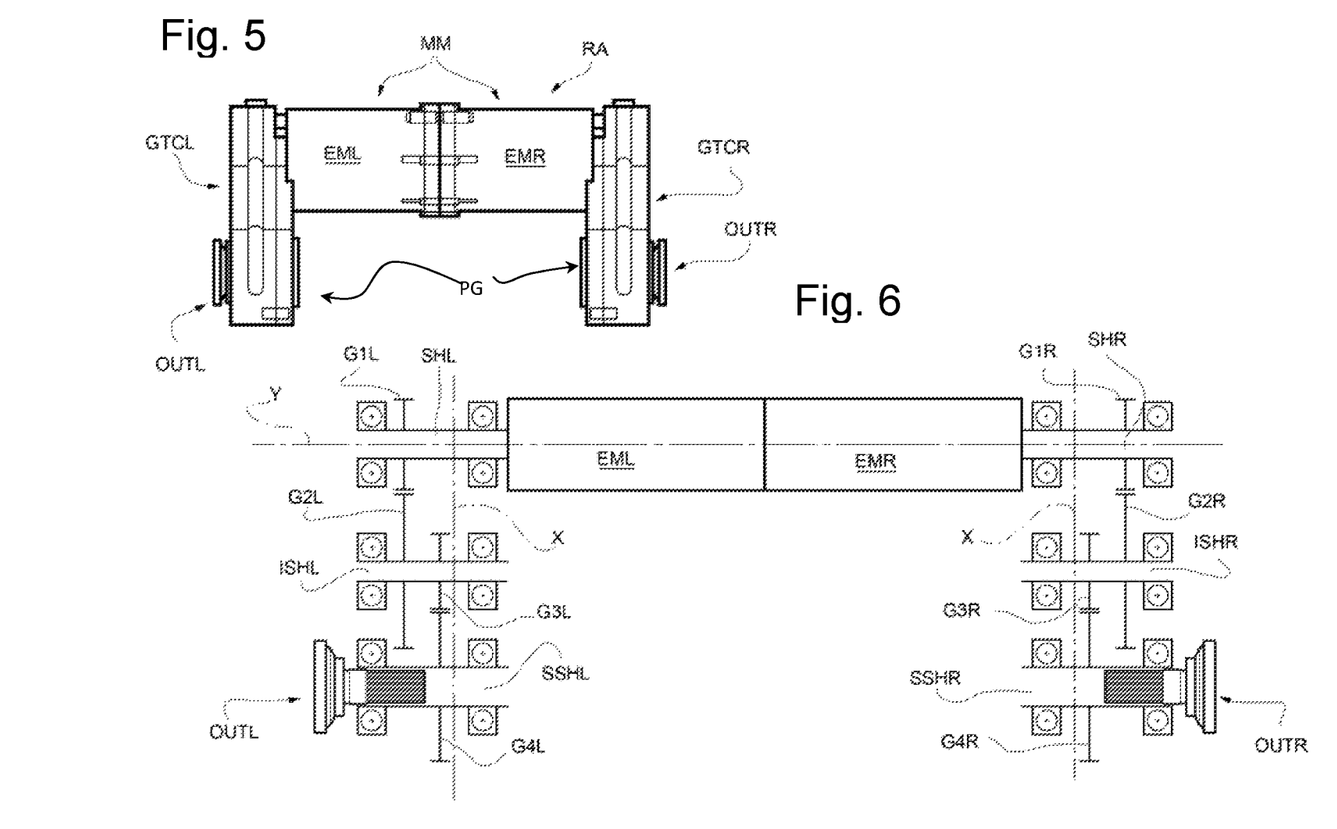
FIG. 5 shows a second configuration of a complete rear axle comprising a pair of modules according to the schematic example in FIG. 1.
FIG. 6 shows the same axle as in FIG. 5 in which at least a portion of the motor module casings have been removed to make the internal components visible.

With reference to FIGS. 5 and 6, the electric axle RA is made by placing the electric motor-generators side by side so that the relative drive shafts are coaxial with each other along the Y direction indicated in FIG. 1, while the respective gear trains are in a reciprocally distal/external position. In addition, the longitudinal extensions X of the respective GT gear trains lie in the same plane. This causes the axle conformation to be generally U-shaped (inverted in FIGS. 5 and 6).

Figure 7:
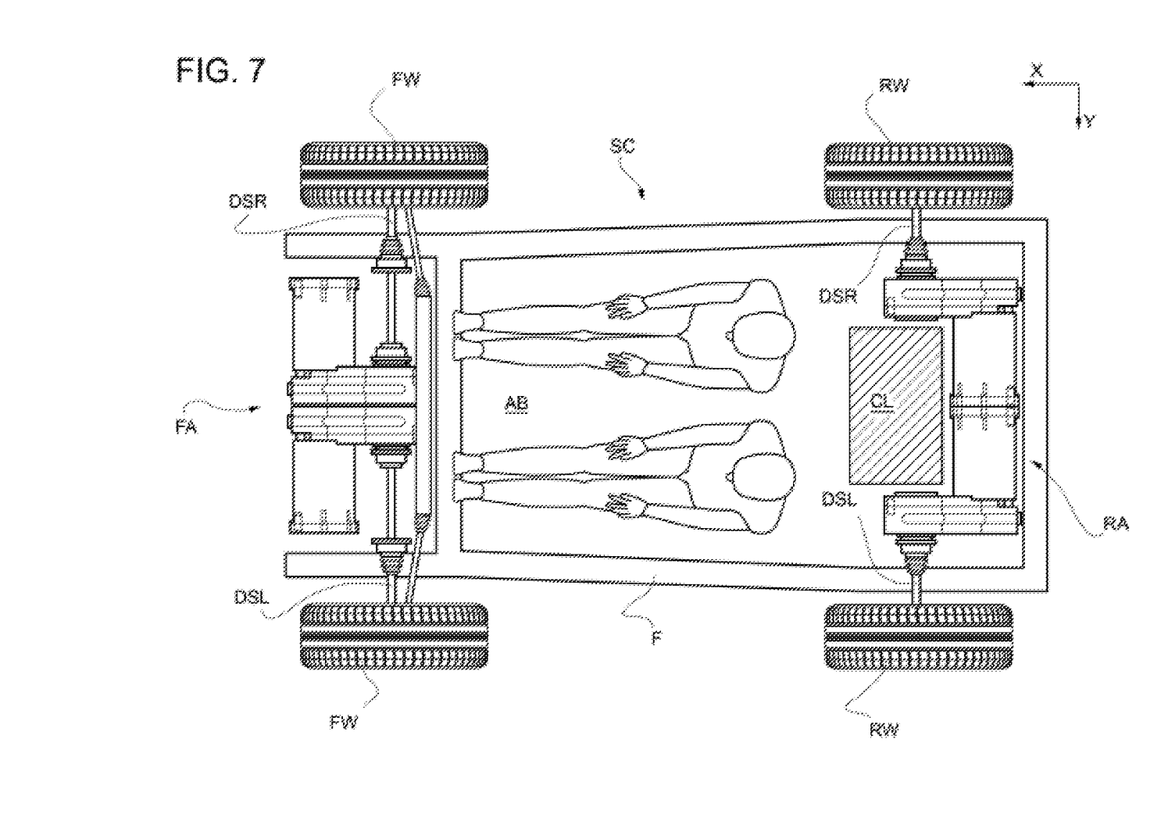
FIG. 7 shows a plan view of a two-seater electric sports vehicle implementing both the electric axles in FIGS. 3 and 5.

FIG. 7 schematically shows a high-performance sports car with two seats only arranged in the passenger compartment AB.

The front electric axle FA described with the aid of FIGS. 3 and 4 is arranged in front of the passenger compartment AB in which the seats for the two places only are housed. Evidently, the car has a longitudinal extension in the direction X, while the electric axle FA is placed transversely to the extension of the car to be connected to the front wheels FW and drive them in rotation.

The rear electric axle RA described with the aid of FIGS. 5 and 6 is arranged to the rear of the passenger compartment AB in which the seats for the two places are housed. As before, the car has a longitudinal extension in the direction X, while the electric axle RA is arranged transversely to the extension of the car, to be connected to the rear wheels RW and drive them in rotation.

In particular, the right OUTR and left OUTL outputs are connected to the front and rear wheels by means of right DSR and left DSL axle shafts respectively equipped with suitable joints, in themselves known.

With regard to the rear axle, it identifies a clearance area CL, delimited on three sides by the U-shaped axle that evidently lies parallel to the bottom/floor of the vehicle, i.e. parallel to the plane passing through the axis of rotation of the four front FW and rear RW wheels of the sports car.

In the examples shown, the hump of the axle U-shape is rearwardly oriented, as a result the clearance area CL is arranged between the electric axle RA and the vehicle passenger compartment AB.

In said area, a battery pack BAT or an internal combustion engine CE may advantageously be housed, as shown in FIG. 6 showing the rear portion of the sports car in FIG. 5, rotated anticlockwise.

When said free area CL is occupied by the battery pack BAT, it is preferable for the inner ends of the secondary shafts SHR, SSHR to be made inaccessible by the plugs PG shown in FIG. 5.

Figure 11:
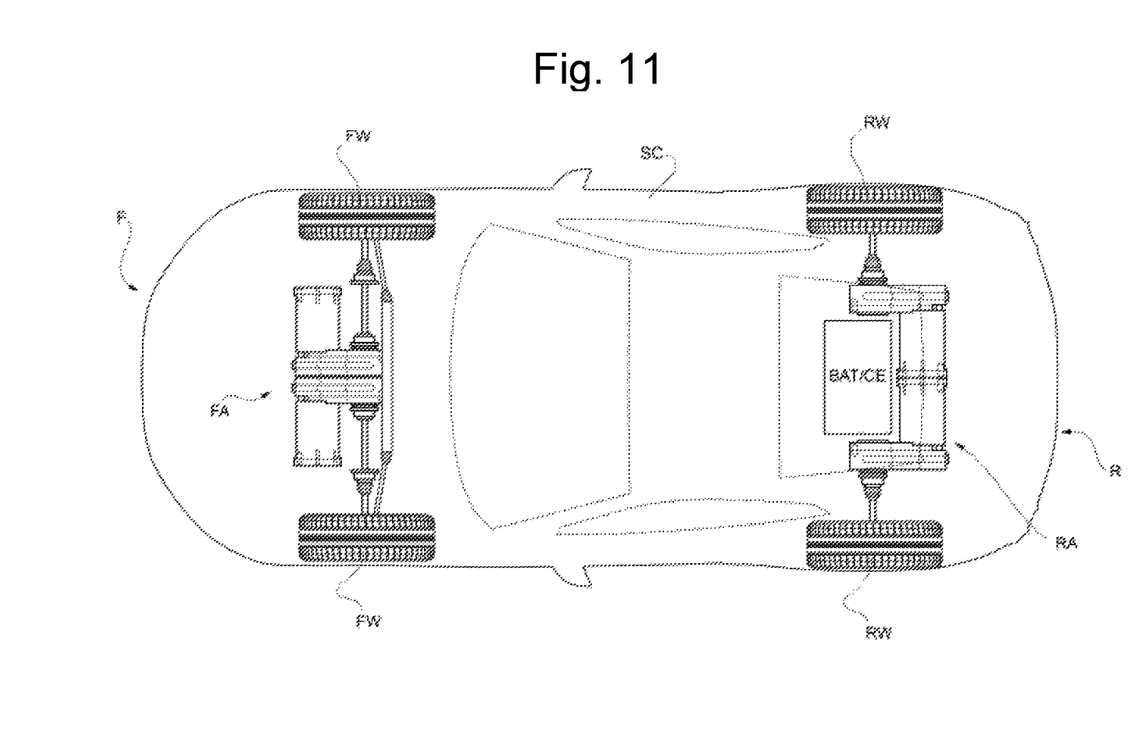
FIG. 11 shows an electric or hybrid sports car implementing the electric axles in FIGS. 3 and 5.

When said area is occupied by the battery pack, and the axle is rearwardly oriented as in FIGS. 7 and 11, according to a preferred embodiment of the present invention, the vehicle floor can be opened and the levers of the rear suspensions are arranged to allow the removal of the battery pack from the lower part of the vehicle.

Depending on the circumstances, the hump of the U-shape defined by the electric axle RA can be oriented forward when, for example, it is expected to be possible to unload/load the battery pack from a rear door of the sports car.

As regards the front axle, it has the electric motor-generators in a position distal to the passenger compartment AB of the vehicle, i.e. with the relative gear trains facing backwards, towards the rear axle.

This arrangement is particularly advantageous because it allows easy housing of the steering box SW. From FIG. 8, it is immediately noticeable that the footprint of the front electric axle FA is minimal in the area between said axle and the passenger compartment AB.

Figure 9:
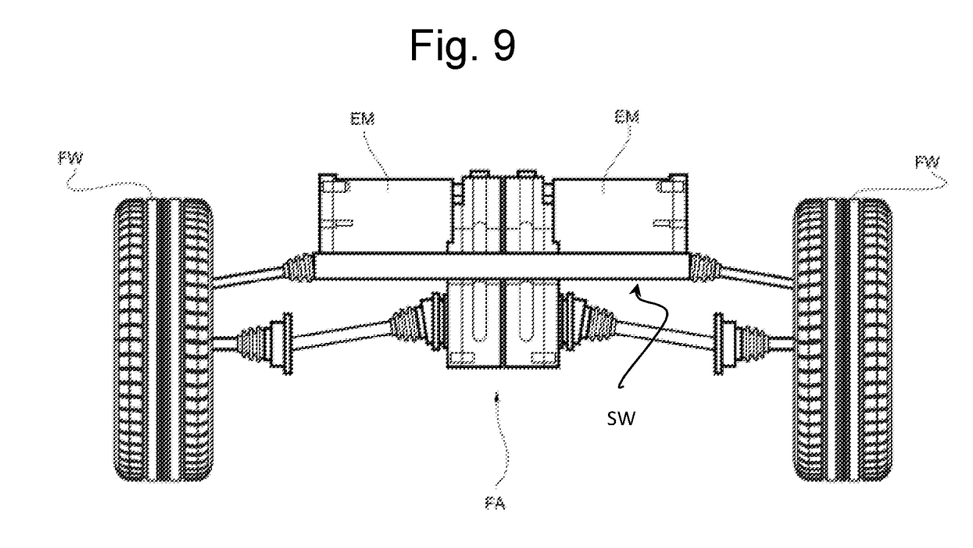
FIG. 9 shows an alternative configuration to the configuration shown in FIG. 8.

In general, both axles have a planar shape, it is thus possible to arrange the steering box SW above the gear trains, avoiding any interference between the components, as shown in FIG. 9.

FIG. 11 shows an electric or hybrid sports car SC equipped with the rear electric axle RA arranged to drive the rear wheels RW of the car and a front axle FA arranged to drive the front wheels FW. When the car is electric, a battery pack BAT is housed in the clearance area CL confined by the rear axle, while when the car is not (fully) electric, an internal combustion engine CE is housed therein. For this reason, the sign BAT/CE is indicated.

In this figure, the front F and rear R of the vehicle are clearly shown so as to further clarify the concept of rear orientation of the hump of the U-shape defined by the electric axle according to the present invention.

It is important to note that each motor module MM is completely free of clutches, i.e. of mechanical parts having the function of connecting two shafts on command to allow or prevent and possibly modulate the transmission of the rotatory motion; in other words, a clutch is a mechanism which, using friction, allows a gradual separation/combination of the motion of two shafts which rotate at different speeds and the gear trains GT do not comprise any clutch interposing the transmission of the motion from the electric motor-generators EM to the corresponding drive wheels RW.

The motor modules are fixed to the vehicle frame F and are preferably driven independently of each other, being mechanically independent, and thus allow the corresponding electric machines EM and the corresponding drive wheels RW to rotate at different rotation speeds, especially when driving around a bend.

A VCU processing unit is configured to calculate a different rotation speed between the right output OUTR and the left output OUTL of the electric axle, for example based on a steering angle. This information is generally available on a vehicle data network CAN, since this data is essential for the various safety systems generally available on board the car, such as the ESP (Electronic Stability Program).

Evidently, the vehicle is equipped with an inverter for each of the motor generators so that it can control the power supply of each one independently. In addition, the VCU processing unit is programmed to perform regenerative braking allowing recovery of the electrical energy from the kinetic energy of the vehicle, when it needs to be decelerated.

Figure 10:
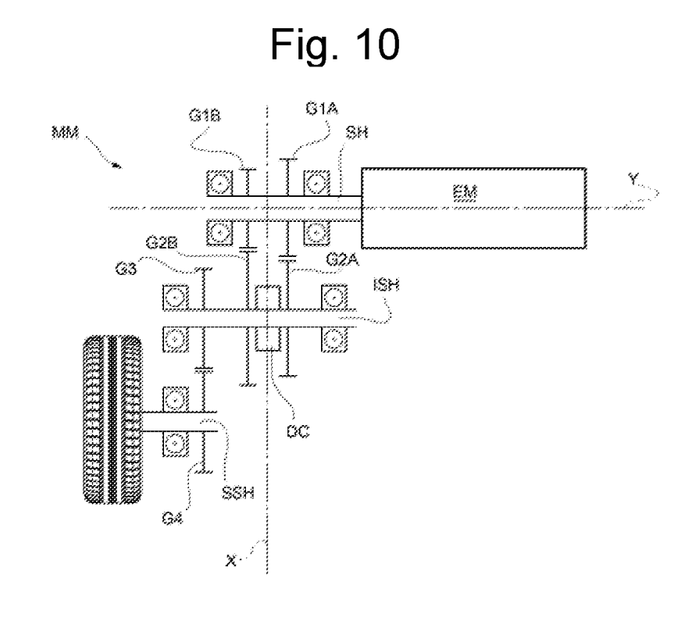
FIG. 10 shows a variant of the motor module in FIG. 2.

FIG. 10 shows a variant of the gear train of the motor module MM. According to a preferred variant of the invention, two gearwheels of different diameter G1A and G1B are fitted onto the drive shaft, which mesh with respective gearwheels G2A and G2B fitted onto the intermediate shaft ISH.

Between the two wheels G2A and G2B fitted onto the intermediate shaft ISH, a DC synchronizer is arranged so as to allow one of the two geared wheels to be made rigidly connected with said intermediate shaft alternately. As a result, while the two gearwheels fitted onto the drive shaft SH are permanent, the gearwheels fitted onto the intermediate shaft are rotatably associated so as to allow the gear ratio to vary.

The same result can be achieved by making the second gearwheels G2A and G2B fixed permanently with the intermediate shaft and by making the first gearwheels G1A and G1B rotatably associated with the drive shaft and positioning the DS synchronizer on the drive shaft.

When the car is of the hybrid type there is an internal combustion engine CE in the free area CL equipped with its own gearbox and two opposite output shafts, intended to drive the rear wheels RW of the car in rotation. Said output shafts are preferably coupled to the left and right secondary shafts of the electric axle, respectively.

Each secondary shaft SSH therefore has an outer end defined as an output OUT connected to a respective wheel by the above-described axle shaft DS (right DSR or left DSL). The inner end, opposite the output OUT, of the secondary shaft is permanently connected with an output shaft of the internal combustion engine gearbox.

Overall, the rear electric axle RA equipped with right and left axle shafts has an Omega Ω shape.

Overall, the front electric axle FA equipped with right and left axle shafts has an H shape.

When the car is hybrid and the configuration of FIG. 10 is implemented, wherein the gear train is equipped with two gear ratios, the synchronizer can be configured to disengage both the second gearwheels G2A and G2B. This can be useful to help the low-speed heat engine and disconnect the electric axle from the transmission, when the car exceeds a predetermined speed.

According to a preferred variant of the car, not shown, only a front electric axle FA is implemented as shown in FIGS. 3, 4, 8 and 11, while the rear axle is driven only by the internal combustion engine CE.

Thanks to the present invention, with a single L-shaped motor module it is possible to create a T-shaped front electric axle preferably lying parallel to the plane of the car, optimising the space needed to house a steering box. At the same time a rear, U-shaped electric axle RA can be made preferably lying parallel to the plane of the car which optimizes the space needed to house an internal combustion engine and/or battery pack.

According to a further aspect of the present invention, two casings are made by moulding using a single mould which simultaneously makes the right casing GTCR and the left casing GTCL in a single piece as shown in FIG. 3. When it is necessary to separate the casings to make the U-shaped configuration for the rear axle, then the two casings can be separated by cutting them. This aspect further contributes to optimizing the means and thus the production costs of the car alone according to the present invention.

Although the accompanying drawings are not to scale, they clarify the potential of the present invention.

According to the present invention, the car may comprise a single electric axle, front and/or rear, or both, and the three combinations obtained may still be combined with the presence of an internal combustion engine for a total of at least six combinations.

Embodiment variants are possible to the non-limiting example described, without departing from the scope of protection of the present invention, comprising all the equivalent embodiments for a person skilled in the art, to the content of said claims.

The person skilled in the art is able to achieve the object of the invention from the aforesaid description without introducing further construction details.

The invention claimed is:

1. An electric or hybrid (SC) vehicle comprising four wheels (FW, RW), a front electric axle (FA), and a rear electric axle (RA); each electric axle (FA, RA) comprises a pair of motor modules (MM), each comprising:
   an electric motor-generator (EM) having a relative drive shaft (SH) identifying a rotation axis (Y);
   a secondary shaft (SSH);
   at least one intermediate shaft (ISH);
   a gear train fitted onto the drive shaft (SH), the secondary shaft (SSH) and onto the intermediate shaft (ISH), to transfer a rotary motion from said drive shaft (SH) to said secondary shaft (SSH) and vice versa;
   a gearbox case (GTC) that encloses said gear train which is permanently fixed to a stator of said electric motor-generator (EM) and has an elongated shape that defines an extension axis (X) perpendicular to said rotation axis (Y);
   wherein, in each motor module (MM), said secondary shaft (SSH) and said intermediate shaft (ISH) are arranged parallel to said drive shaft (SH);

wherein, in each motor module (MM), said drive shaft (SH) and said secondary shaft (SSH) define a plane and wherein said intermediate shaft (ISH) lies on said plane;

wherein each motor module (MM) is substantially L-shaped;

wherein, in each electric axle (FA, RA), the two motor modules (MM) are mutually and stably associated so that the respective drive shafts (SHR, SHL) are coaxial with each other;

the electric vehicle (SC) is characterised in that:

in the front electric axle (FA) the gearbox cases (GTCR, GTCL) of the two motor modules (MM) are arranged parallel to each other and mutually connected giving the front electric axle (FA) a T-shape; and in the rear electric axle (FR) the stators of the electric motor-generators (EMR, EML) of the two motor modules (MM) are reciprocally connected so that the gearbox cases (GTCR, GTCL) are parallel to each other and arranged in an external position giving the rear electric axle (RA) a U-shape.

2. The vehicle (SC) according to claim 1, wherein each gear train defines a fixed gear ratio.

3. The vehicle (SC) according to claim 1, wherein each gear train comprises a device for selecting one or more gear ratios (G2A, G2B, DS).

4. The vehicle (SC) according to claim 1, wherein each gear train comprises:
a first gear wheel (G1) fitted onto the drive shaft (SH);
a second gear wheel (G2) which meshes with the first gear wheel (G1) and is fitted onto the intermediate shaft (ISH);
a third gear wheel (G3) fitted onto the intermediate shaft (ISH); and
a fourth gear wheel (G4) which meshes with the third gear wheel (G3) and is fitted onto the secondary shaft (SSH).

5. The vehicle (SC) according to claim 1, wherein each secondary shaft (SSH) has an end defining an output (OUTR, OUTL) of the motor module, arranged externally, to be operatively connected to an axle shaft (DSR, DSL).

6. The vehicle (SC) according to claim 1, wherein rotation axes of said four wheels identify a plane and in which said rotation axis (Y) of said drive shafts (SHR, SHL) and said extension axes of said gearbox cases (GTR, GTL) lie in said plane.

7. The vehicle (SC) according to claim 6, wherein:
said rear electric axle (RA) defines a clearance area (CL) in said plane, confined on three sides by said electric axle (RA) and by a passenger compartment (AB) of the vehicle; and
wherein, a battery pack (BAT) or an internal combustion engine (CE) is housed in said clearance area.

8. The vehicle (SC) according to claim 7, wherein:
said battery pack (BAT) is housed in said clearance area; and
a floor of said vehicle (SC) comprises a closable opening permitting the extraction of said battery pack (BAT) through said floor.

9. The vehicle (SC) according to claim 7, wherein:
each secondary shaft has a first end defining an output (OUTR, OUTL) of the motor module, arranged externally, for being connected in operation to an axle shaft (DSR, DSL) and a second end, opposite to the first end; and
an internal combustion engine (CE) is housed in said clearance area, having its own gearbox and a pair of output shafts each connected to a relative second end of said secondary shaft to cooperate in guiding said rear wheels (RW) in rotation.

10. The vehicle (SC) according to claim 7, wherein:
said front electric axle (FA) is arranged at the front of said vehicle passenger compartment (AB) with said gearbox cases (GTCR, GTCL) orientated backwards; and
said vehicle further comprises a steering box (SW) arranged above said electric axle or between said front electric axle (FA) and said passenger compartment.

* * * * *